US009564016B2

(12) United States Patent
LaDuca

(10) Patent No.: US 9,564,016 B2
(45) Date of Patent: Feb. 7, 2017

(54) CRISS CROSS POKER CASINO CARD GAME WITH MIDDLE BET AND FIVE CARD BONUS BET

(71) Applicant: AGS, LLC, Las Vegas, NV (US)

(72) Inventor: Ronald LaDuca, Cherry Hill, NJ (US)

(73) Assignee: AGS LLC, Las Vegas, NV (US)

( * ) Notice: Subject to any disclaimer, the term of this patent is extended or adjusted under 35 U.S.C. 154(b) by 241 days.

(21) Appl. No.: 14/315,328

(22) Filed: Jun. 26, 2014

(65) Prior Publication Data

US 2015/0379821 A1 Dec. 31, 2015

(51) Int. Cl.

| | |
|---|---|
| ***G06F 17/00*** | (2006.01) |
| ***G07F 17/32*** | (2006.01) |
| ***A63F 1/00*** | (2006.01) |
| ***A63F 3/00*** | (2006.01) |

(52) U.S. Cl.

CPC ............. *G07F 17/3262* (2013.01); *A63F 1/00* (2013.01); *A63F 3/00157* (2013.01); *G07F 17/3244* (2013.01); *G07F 17/3293* (2013.01); *A63F 2001/005* (2013.01)

(58) Field of Classification Search

USPC ........... 463/11-13; 273/148 R, 149 R, 149 P, 273/148 A, 309

See application file for complete search history.

(56) References Cited

U.S. PATENT DOCUMENTS

| | | | | |
|---|---|---|---|---|
| 5,489,101 A | | 2/1996 | Moody | |
| 5,531,448 A | | 7/1996 | Moody | |
| 5,657,993 A | | 8/1997 | Merlino | |
| 5,951,012 A | * | 9/1999 | Feola | A63F 3/00157 273/274 |
| 5,975,529 A | | 11/1999 | de Keller | |
| 6,042,118 A | | 3/2000 | Poitra | |
| 6,048,267 A | | 4/2000 | Wichinsky | |
| 6,817,615 B1 | | 11/2004 | Dacey | |
| 7,341,510 B2 | * | 3/2008 | Bourbour | A63F 1/12 273/138.1 |
| 7,510,190 B2 | * | 3/2009 | Snow | A63F 3/00157 273/292 |
| 7,584,967 B2 | | 9/2009 | Webb et al. | |
| 8,585,478 B2 | * | 11/2013 | Smith | A63F 3/00157 273/139 |
| 8,590,900 B2 | | 11/2013 | Yoseloff | |

(Continued)

OTHER PUBLICATIONS

International Search Report for PCT/US2015/015558 filed Feb. 12, 2015, mailed May 18, 2015, in 3 pages.

(Continued)

*Primary Examiner* — Ronald Laneau

(74) *Attorney, Agent, or Firm* — Weide & Miller, Ltd.

(57) ABSTRACT

One step of the present method involves making an across ante and a down ante and an optional five card poker bet. Other steps involve making an across bet or folding, making a down bet or folding, and making a middle bet or folding. All winning bets are paid out against a designated payout table for that bet. A winning middle bet is paid to the higher of the two five card poker hands formed by the players two dealt cards and either the three across community cards or the three down community cards. A winning five card bonus bet is paid to a winning five card poker hand formed by the five community cards forming the cross. The method may be played on criss cross poker layouts on actual or simulated casino card tables or on electronic devices.

20 Claims, 4 Drawing Sheets

(56) References Cited

U.S. PATENT DOCUMENTS

| | | | |
|---|---|---|---|
| 2005/0242506 A1 | 11/2005 | Yoseloff | |
| 2006/0255541 A1 | 11/2006 | McBride | |
| 2006/0270477 A1 * | 11/2006 | Snow | A63F 1/00 463/11 |
| 2006/0273518 A1 | 12/2006 | Aida | |
| 2006/0281513 A1 * | 12/2006 | Kirkpatrick | A63F 3/00157 463/13 |
| 2008/0136104 A1 | 6/2008 | Matanky | |
| 2010/0105460 A1 * | 4/2010 | Makhoul | G07F 17/32 463/13 |
| 2012/0149451 A1 | 6/2012 | Nicely et al. | |
| 2012/0225706 A1 | 9/2012 | Yoseloff | |

OTHER PUBLICATIONS

Written Opinion for PCT/US2015/015558 filed Feb. 12, 2015, mailed May 18, 2015, in 7 pages.

Mississippi Stud, Shuffle Entertainment, Inc., http://www.wsgc.wa.gov/activities/game-rules/mississippi-stud.pdf, 17 pages, Oct. 28, 2014.

* cited by examiner

CRISS CROSS POKER CASINO CARD GAME WITH MIDDLE BET AND FIVE CARD BONUS BET

CROSS-REFERENCE TO RELATED APPLICATIONS

The present utility application claims the benefit of provisional application 66/966,158, filed Feb. 14, 2014.

STATEMENT REGARDING FEDERALLY SPONSORED RESEARCH/DEVELOPMENT

Not Applicable.

THE NAMES OF THE PARTIES TO A JOINT RESEARCH OR DEVELOPMENT

Not Applicable.

BACKGROUND OF THE INVENTION

Field of the Invention

The present invention relates to casino card games and particularly to a method of playing a criss cross poker casino card game with an additional middle bet and an optional five card bonus using the same board cards as the criss cross poker game without altering the play of the criss cross poker casino card game.

Description of Related Art Including Information Disclosed Under 37 CFR 1.97 and 1.98

Gamblers enjoy side betting in games to double the opportunity of winning and just to have another opportunity to gamble. But there is also a need to preserve the integrity of the game being played to maintain the original unadulterated use of cards and play so that the original card game is not altered by the optional side betting game and that players can play the original casino card game without the optional side betting if they choose. Prior art casino card games related to criss cross poker, which provide a number of community cards dealt face down on a playing table to be combined with cards dealt to each player often provide two possible five card poker hands comprised of two different sets of community cards in combination with a players dealt cards. But none of the prior art games provide an optional extra side bet on the community cards themselves forming a winning hand. Prior art casino card games based on a criss cross type of configuration generally provide betting opportunities on player cards combined with one or the other of two different sets of community cards, but not the option of a third bet on both sets of community cards combined with the player cards that pays if either of the two combinations provide a winning hand.

Poker games played against other players and/or against a dealer hand add a level of difficulty and human judgment which complicates winning rather than just winning on the value of the cards themselves against a payout table. The payout table game provides a faster game and more certainty on the part of the player that a hand will pay off, even if the player lacks competitive play skill, and also does not depend upon how good or how bad the hands of the other players or the dealer may be.

U.S. Patent Application #US20120149451, published Jun. 14, 2012 by Nicely et al, discloses a gaming device which provides a single player poker game including one or more opportunities for forming player hands. In one embodiment, for a play of the poker game, a player places a wager on each of a plurality of player hands. The gaming device provides the player with one or more opportunities to fold one or more of the player hands and withdraw the wager associated with the folded hand. A number of community cards are dealt. The gaining device determines and provides any awards associated with a ranking of each of the remaining player hands according to a paytable.

U.S. Patent #62/048,267, issued Apr. 11, 2000 to Wichinsky, indicates a multiple hand stud poker game wherein a player wagers on one or multiple hands and using a single standard fifty-two card deck of playing cards. Three cards are dealt face up to each of the player hands. Two cards are then dealt—one face up and one face down—to be used as cards that can be selected by the player for use in the player's hand. The player selects either the face up card or the face down card. The selected card is added to the player's first hand and is displayed face up. The unselected card is then discarded. Two more cards are dealt—one card face up and one card face down. The player again selects either the face up card or the face down card. The selected card is added to the player's second hand and is displayed face up with the unselected card being discarded. Two more cards are dealt—one card face up and one card face down. The player again selects either the face up card or the face down card. The selected card is added to the player's third hand and is displayed face up with the unselected card being discarded. The same procedure is used to add a fifth card to each of the player's hands. This results in the player having three complete five card hands. The amount won by the player is based on the amount wagered by the player and the poker ranking of the player's hand based on a payout schedule.

U.S. Patent #6/042,118 issued to Poitra, describes a method of playing a poker-type game wherein the game provides the players an opportunity to increase the amount wagered based upon two of three community cards shown. After each player places a bet, two cards are dealt face down to each player and three cards are dealt face down to the dealer that are "community cards". The dealer then turns over two of the three community cards so that they are facing up. Each player has the opportunity to "double-down". The dealer then turns over the remaining community card and then turns over each player's two cards. The bets are resolved by using the three community cards in combination with each player's two cards based upon a predetermined plurality of winning card combinations similar to poker. The card deck is a standard 52 card deck with one joker to make a 53 card deck. The joker is utilized only in certain combinations as a 'wild card.

U.S. Patent Applications #US20050242506, published Nov. 3, 2005 and #US20120225706, published Sep. 6, 2012 both Mississippi Stud variations by Yoseloff, claim a card game played against a pay table, Wherein the player receives a partial hand that is preferably completed by community cards (but may be completed by cards dealt directly to a hand or a combination of cards dealt directly to a hand and at least one community card or Wild card). After placement of an Ante Wager, each player Will have an opportunity to place a game Wager before receiving another card for the player's hand (Whether dealt directly to the player or as a community card revealed to all players). At least some or all game Wagers may be an amount within a range of multiples of the player (such as 1×, 2×, 3× 4× or 5× the amount of the Ante Wager). The range of Wagers may remain the same or vary with the number of dealt cards or community card revealed to the players.

U.S. Pat. Nos. 5,489,101 and 5,531,448, issued to Moody, describe poker games in which a player attempts to form a five card poker hand that has the highest poker hand ranking. In the house banked version, all players play against the house and not against each other. The game is played with a standard fifty-two card deck. The game is played by a dealer and from one to seven players. Each player makes a bet and a portion of each bet may be allocated to a progressive jackpot. The dealer deals five cards to each player. The dealer then deals six cards as the community cards which are arranged face down in three rows in a triangle pattern on the gaming table layout. The players may discard from none to five unwanted cards. The dealer turns up the community cards and pre-designated groups of cards from the community cards are used for each player to make a complete five card poker hand. The dealer determines the best hand each player has made according to poker hand rankings. All winning hands will be paid by the dealer according to the odds listed in the pay table. When the progressive jackpot payout is used, the dealer examines the six community cards to determine if one of the predetermined card arrangements has occurred. Any winning payouts from the progressive jackpot are distributed to the players at the table. The method may also be played as a player banked game or as a pot game. In one version of the present invention, the dealer deals three cards to each player. The dealer then deals eight cards as the community cards which are arranged in groups or pairs of two cards each on the gaming table layout. In the preferred embodiment of the present invention, the card layout is in the format of a directional compass with a pair of cards each at the North position, East position. South position and West position, respectively.

U.S. Pat. No. 5,657,993, issued to Merlino, describes a method of playing a poker-type wagering game on top of a table layout having first and second player locations, a plurality of betting areas associated with each of the player locations and a community card area. The method includes a first player placing a wager on top of each of the betting areas associated with the first player location. A second player places a wager on top of each of the betting areas associated with the second player location. Each player receives two playing cards. A number of community cards are dealt face down in the community card area in a predetermined pattern. The number of community cards corresponds to the number of betting areas in one of the player locations. The faces of community cards are exposed in succession. Each time a community card is exposed, each of the players can either fold wherein the folding player loses a number of wagers which corresponds to the number of community cards exposed or the players can leave all of the wagers on the corresponding betting areas until all of community cards are exposed. Once all of the community cards are exposed, each of the players combines his or her pair of cards with three of the community cards to form a completed stud poker hand. The player with the highest ranking hand wins all of the wagers.

U.S. Pat. No. 5,975,529, issued to de Keller, describes a poker game played on a blackjack style table with a single dealer. The player opening the betting is rotated for each game. The game is played with chips/counters of various denominations. At the start of each game all players place a bet of equal value in their respective pots. Players then place Bet 1 (the maximum and minimum value thereof being determined by the house) and each player is dealt two cards (this number may vary), face-down, and the dealer receives three cards (this number may vary) one face-up and two face-down. The three dealer's cards are community cards, referred to as the 'flop' and complete each player's hand. The players, at this stage know the identity of three cards and each player has the option of discarding their first or second card, or both, face down. Replacements, face-down, are received for discards. Players may at this stage, either 'stand' by making no further bets or 'raise' by wagering on Bet 2. The Bet 2 wager must be exactly equal in value to the amount wagered on Bet 1. When all wagers have been placed on Bet 2 the fourth card is revealed by the dealer. Players may again either stand at this stage or raise by wagering on Bet 3. Players are not permitted to make a third bet if they have not placed the second. The Bet 3 wager must be exactly equal in value to the amount wagered on Bet 1. When all third bets have been placed the dealer turns up the fifth card. Each player reveals his/her cards and provided they show a winning hand on the list of poker rankings hands are paid according to the total stake placed at the corresponding pay-offs/odds. The player with the highest poker hand is awarded all the Pot bets; in the event of players holding identical hands the Pot is shared. No matter how many cards constitute community cards or how many cards are dealt to each player, the players select five cards to make up their hands. There is no variation in wagering allowed, and competition includes wagers against the pot.

What is needed is a method of playing a criss cross poker casino card game combined with an additional middle card bet and an optional five card poker bonus bet wherein a player competes solely against posted payout tables and the additional and optional bets use the same cards as the criss cross poker casino card game without interfering with the regular play of the criss cross poker casino card game.

BRIEF SUMMARY OF THE INVENTION

An object of the present invention is to provide a method of playing a criss cross poker casino card game combined with an additional middle card bet and an optional five card poker bonus bet wherein a player competes solely against posted payout tables and the additional and optional bets use the same cards as the criss cross poker casino card game without interfering with the regular play of the criss cross poker casino card game, wherein the additional middle bet is for the higher winning poker hand of the two poker hands formed by combining the player's two dealt cards with either the across three community cards or the down three community cards and the five card bonus bet is for a winning five card poker hand formed by the five criss cross community cards.

Another object of the present invention is to provide a method of playing a criss cross poker casino card game combined with an additional middle card bet and an optional five card poker bonus bet wherein the player competes solely against posted payout tables by placing two ante wagers of equal amounts within the posted minimum and maximum wagers, and then placing up to three separate bet wagers one to three times an ante wager and an optional five card bonus wager according to betting limits set by the casino for minimum and maximum five card bonus bet amounts.

In brief, an across ante and a down ante are made to start the game according to the table betting amounts. An optional five card bonus bet may be placed according to betting limits set by the casino for the minimum and maximum five card bonus bet amounts.

Five community cards are dealt face down for all players to use in combination with two cards dealt face down to each player. The community cards are placed on the table in the configuration of a cross with a middle card and an outside card on each side of the middle card forming three community horizontal "Across Cards" and the middle card and outside cards above and below the middle card forming three community vertical "Down Cards".

After the cards are dealt, a player may place an "Across Bet" of one to three times the ante that the players two dealt cards in combination with the three "Across Cards" form a winning five-card poker hand against a payout table. Alternately, the player may fold and forfeit the two antes. The two outside horizontal or across cards are then turned over by the dealer.

A player may then place a "Down Bet" that the player's two dealt cards in combination with the three "Down Cards" form a winning five-card poker hand against a payout table. Alternately the player may fold and forfeit the antes and the across bet. Then the two outside vertical or down cards are then turned over by the dealer.

At this time the player may place a "Middle Bet" that the player's two dealt cards in combination with either the three community across cards or the three community down cards forms a winning hand, with the higher hand being paid out according to a payout table. Alternately the player may fold and forfeit the antes, the across bet, and the down bet. The dealer then turns over the middle community card.

After the middle card is turned up, all winning bets are paid: the across bet, the down bet, and the middle bet are paid according to a criss cross payout table. The across ante and the down ante are paid according to the ante payout table. If the five community criss cross cards used together as a five card poker hand is a winning hand, the five card bonus bets are paid according to a five card bonus payout table.

The additional middle bet and the optional five card bonus bet are played with the same cards as the criss cross poker casino card game and do not affect the play of the criss cross poker casino card game. They provide additional betting opportunities in the criss cross poker casino card game.

BRIEF DESCRIPTION OF THE SEVERAL VIEWS OF THE DRAWINGS

These and other details of the present invention will be described in connection with the accompanying drawings, which are furnished only by way of illustration and not in limitation of the invention, and in which drawings.

DETAILED DESCRIPTION OF THE INVENTION

In FIGS. 1-6, the present invention comprises a method of playing a criss cross poker casino card game combined with an additional middle card bet and an optional five card poker bonus bet wherein a player competes solely against posted payout tables and the additional and optional bets use the same cards as the criss cross poker casino card game without interfering with the regular play of the criss cross poker casino card game.

Figure 1:
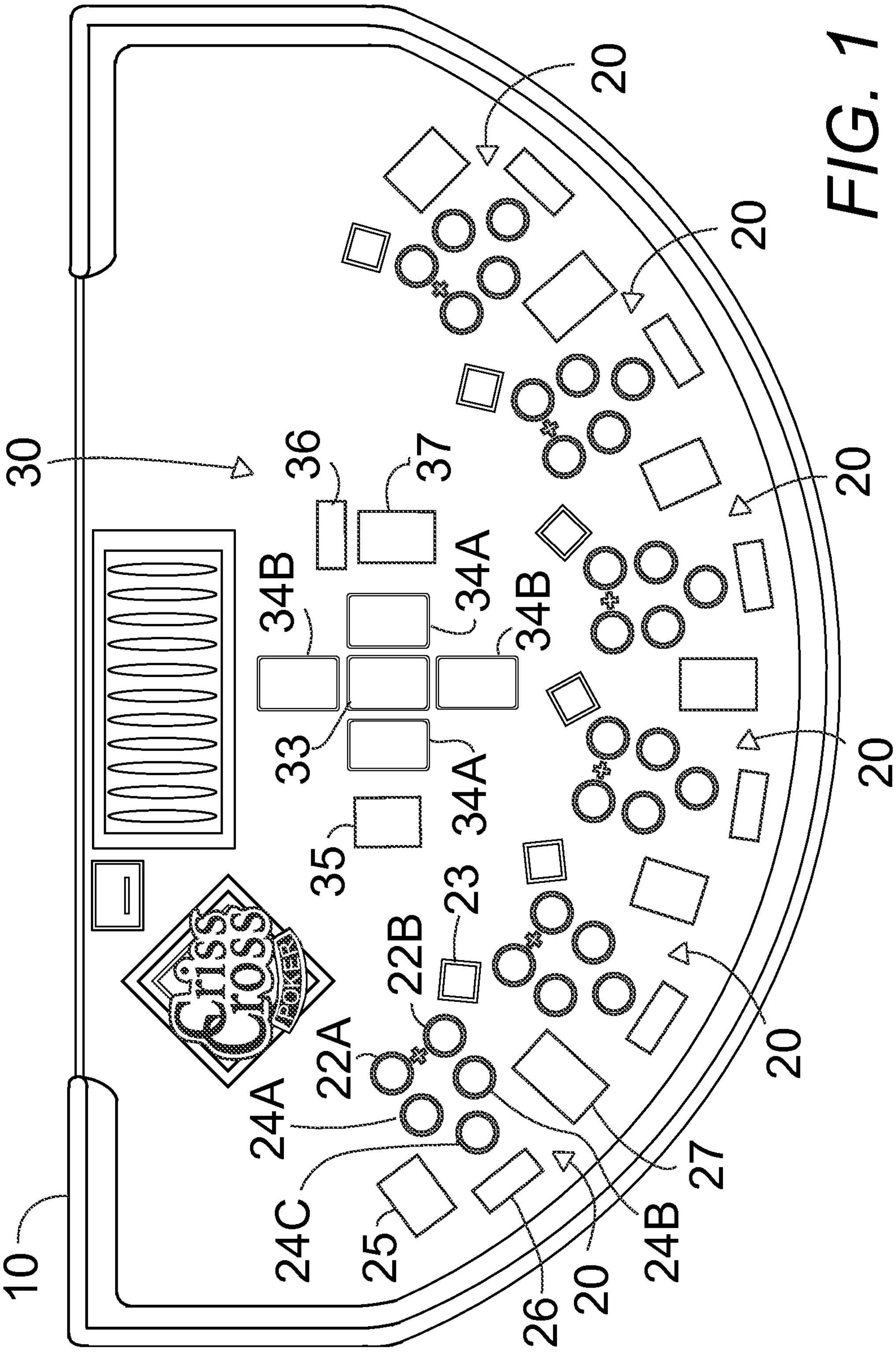
FIG. 1 is a plan view of a casino card game playing table layout for the criss cross poker casino card game combined with an additional middle bet and an optional five card bonus bet of the present invention, showing the player layouts and pay tables facing the players and the dealer layout with the five criss cross community cards and pay tables facing the dealer on the other side of the playing table from the players, and showing an additional middle bet circle and five card bonus bet diamond, and an additional payout table for the five card bonus bet marked in each player layout.
Figure 2:
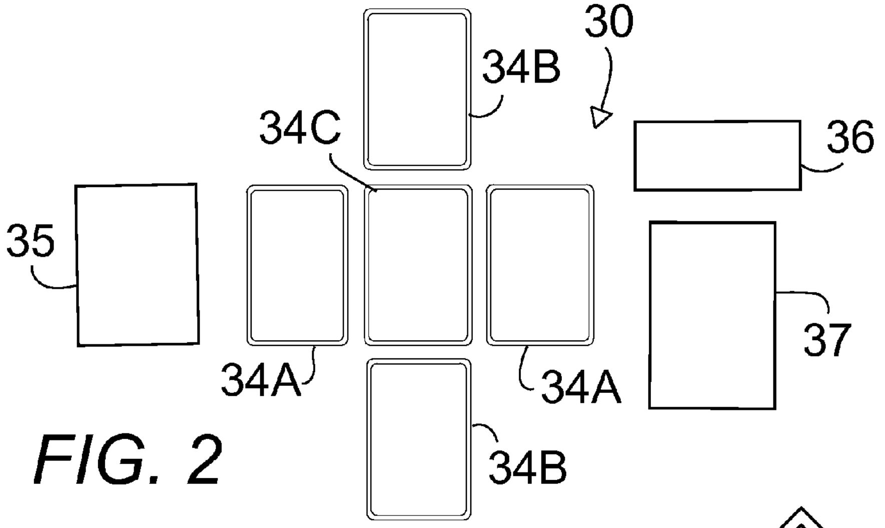
FIG. 2 is an exploded plan view showing the five criss cross community cards and pay tables facing the dealer from the layout of FIG. 1 for the criss cross poker casino card game combined with an additional middle bet and an optional five card bonus bet of the present invention.
Figure 3:
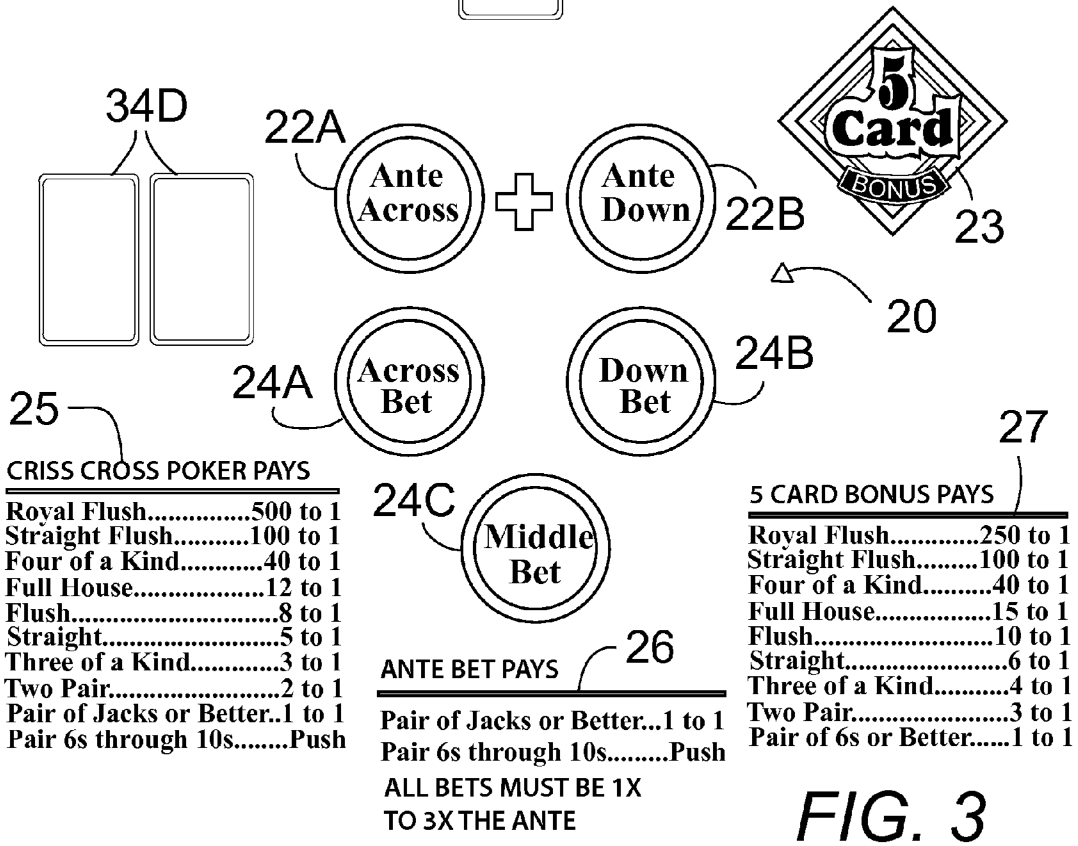
FIG. 3 is an exploded plan view showing the player layout with demarked player betting locations and payout tables of FIG. 1 for the criss cross poker casino card game combined with an additional middle bet and an optional five card bonus bet of the present invention.

The method comprises:

a) a first step of providing a standard 52-card deck of playing cards for playing a standard poker casino card game;

b) a second step of providing a playing layout 10, as shown in FIGS. 1-3, comprising: a demarcation of a criss cross card layout configuration for dealing five community cards on the criss cross card layout, in the dealer layout 30 as shown in FIGS. 1 and 2, to form a cross formation having a middle card 33 and two outer side cards 34A forming a horizontal across partial hand and a top and a bottom outside cards 34 together with the same middle card 33 forming a vertical down partial hand, as well as a dealer criss cross poker payout table 35, dealer ante payout table 36, and dealer five card bonus payout table 37, all facing the dealer; at least one first betting location 20 for at least one player, as shown in FIGS. 1 and 3, the at least one betting location 20 demarking: an across ante location 22A, a down ante location 22B, an across bet location 24A, a down bet location 24B, a middle bet location 24C, and a five card bonus bet location 23, at least one ante payout table 26 indicating payout odds for ante bets for playing a standard criss cross poker casino card game, at least one across bet and down bet and middle bet criss cross poker payout table 25 indicating payout odds for playing a standard criss cross poker casino card game having a middle bet; at least one five card bonus bet payout table 27 indicating payout odds for an optional five card bonus bet;

c) a third step of placing two ante bets of equal value, a first ante bet on an across hand, the first ante placed in an Across Ante 22A marked player portion of a casino table layout, and a second ante bet on a down hand, the second ante placed in a Down Ante 228 marked player portion of the casino table layout in front of each player;

d) a fourth step of placing an optional five card poker hand bonus bet in a Five-Card Bonus 23 marked location on the player portion of the casino table layout in front of each player;

e) a fifth step of dealing five community cards placed in front of the dealer in the dealer layout 30, face down in a cross formation having a middle card 33 and two side cards 34A forming a horizontal across partial hand and a top and a bottom card 348 together with the same middle card 33 forming a vertical down partial hand;

f) a sixth step of dealing two cards 34D, as shown in FIG. 3, face down to each player, the three cards of the across partial hand 33 and 34A and the three cards of the vertical down partial hand 33 and 34B each usable separately with each player's two dealt cards 34D to form a five card poker hand;

g) a seventh step of placing an across bet in an Across Bet 24A marked location on the player portion of the casino table player layout 20 in front of each player making the bet to bet on making a winning poker hand using the player's two dealt cards 34D with the three horizontal community across cards 33 and 34A, or an alternate sixth step of forfeiting the ante bets and folding the player cards;

h) an eighth step of turning over the two horizontal outside cards 34A to the right and left of the middle community card 33;

i) a ninth step of placing a down bet in a Down Bet 24B marked location on the player portion of the casino table player layout 20 in front of each player making the bet to bet on making a winning poker hand using the player's two dealt cards 34D with the three vertical community down cards 33 and 34B, or an alternate eighth step of forfeiting the ante bets and across bet and folding the player cards;

j) a tenth step of turning over the two vertical outside cards 34B above and below the middle community card 33;

k) an eleventh step of placing an additional middle bet in a Middle Bet 24C marked location on the player layout 20 portion of the casino table layout in front of each player making the bet to bet on making a winning poker hand using the player's two dealt cards 34D with either the three horizontal community across cards 33 and 34A or the three vertical community down cards 33 and 34D, or an alternate tenth step of forfeiting the ante bets and the across bet and the down bet and folding the player cards;

l) a twelfth step of turning over the middle community card 33;

m) a thirteenth step of paying out winning player across bets 24A on winning across hands comprised of the player's two dealt cards 34D and three community horizontal across cards 33 and 34A forming a five card poker hand paid out according to the criss cross poker payout table 25;

n) a fourteenth step of paying out winning player down bets 24B on winning down hands comprised of the player's two dealt cards 34D and three community vertical down cards 33 and 34B forming a five card poker hand paid out according to the criss cross poker payout table 25;

o) a fifteenth step of paying out winning player middle bets 24C on the higher winning hand of two hands both using the middle card 33 and the player's two dealt cards 34D, either a winning across hand with the outside horizontal across community cards 34A or a winning down hand with the outside vertical down community cards 34B paid out according to the criss cross poker payout table 25;

p) a sixteenth step of paying out any winning ante bets 22A and 22B according to the ante payout table 26;

q) a seventeenth step of paying out five card bonus bets 23 on the five community cards 33, 34A and 34B of the criss cross card layout forming a winning five card poker hand paid out according to the five card bonus payout table 27;

thereby providing a method of playing a criss cross poker casino card game combined with an additional middle card bet and an optional five card poker bonus bet wherein a player competes solely against posted payout tables and the additional and optional bets use the same cards as the criss cross poker casino card game without interfering with the regular play of the criss cross poker casino card game.

The fourth step of placing an optional five card poker hand bonus bet 23 comprises placing an optional five card bonus bet according to betting limits set by the casino for minimum and maximum five card bonus bet amounts.

The seventh step of placing an across bet 24A comprises placing an across bet of one to three times an ante bet.

The ninth step of placing a down bet 24B comprises placing a down bet of one to three times an ante bet.

The eleventh step of placing a middle bet 24C comprises placing a middle bet of one to three times an ante bet.

Paying out the winning player across bets 24A, down bets 24B, and middle bets 24C comprises paying out the bets according to the criss cross poker payout table 25, as shown in FIG. 3, paying out: 500 to 1 for a royal flush, 100 to 1 for a straight flush, 40 to 1 for four of a kind, 12 to 1 for a full house, 8 to 1 for a flush, 5 to 1 for a straight, 3 to 1 for three of a kind. 2 to 1 for two pair, 1 to 1 for a pair of jacks or better, and push for a pair of sixes to a pair of tens.

Paying out winning ante bets 22A and 22B comprises paying out according to an ante payout table 26, as shown in FIG. 3, paying out: 1 to 1 for a pair of jacks or better, and push for a pair of sixes to a pair of tens.

Paying out winning five card bonus bets 23 comprises paying out winning five card poker hands formed by the five community cards of the cross according to the five card bonus payout table 27, is shown in FIG. 3, paying out: 250 to 1 for a royal flush, 100 to 1 for a straight flush, 40 to 1 for four of a kind, 15 to 1 for a full house, 10 to 1 for a flush, 6 to 1 for a straight, 4 to 1 for three of a kind, 3 to 1 for two pair, and 1 to 1 for a pair of sixes or better.

In FIG. 1, the second step of the method of playing the criss cross poker casino card game combined with an additional middle card bet and an optional five card poker bonus bet comprises providing the playing layout 10 on a casino gaming table having at least one player layout 20 for at least one player sitting at the casino gaming table having a dealer layout 30 for a dealer at the casino gaming table to play the criss cross poker casino card game combined with an additional middle card bet 24C and an optional five card poker bonus bet 23 according to the method of the present invention.

The second step of the method of playing the criss cross poker casino card game combined with an additional middle card bet 24C and an optional five card poker bonus bet 23 may alternately comprise providing the playing layout 10 on a mechanical simulation device, such as a roll-up or fold-up layout as part of a boxed game or portable set for use at home or at a charitable event or party, with the same layout 10 as in the casino table layout of FIG. 1, for at least one player to play the combined criss cross poker casino card game combined with an additional middle card bet 24C and an optional five card poker bonus bet 23 according to the method of the present invention.

Figure 4:
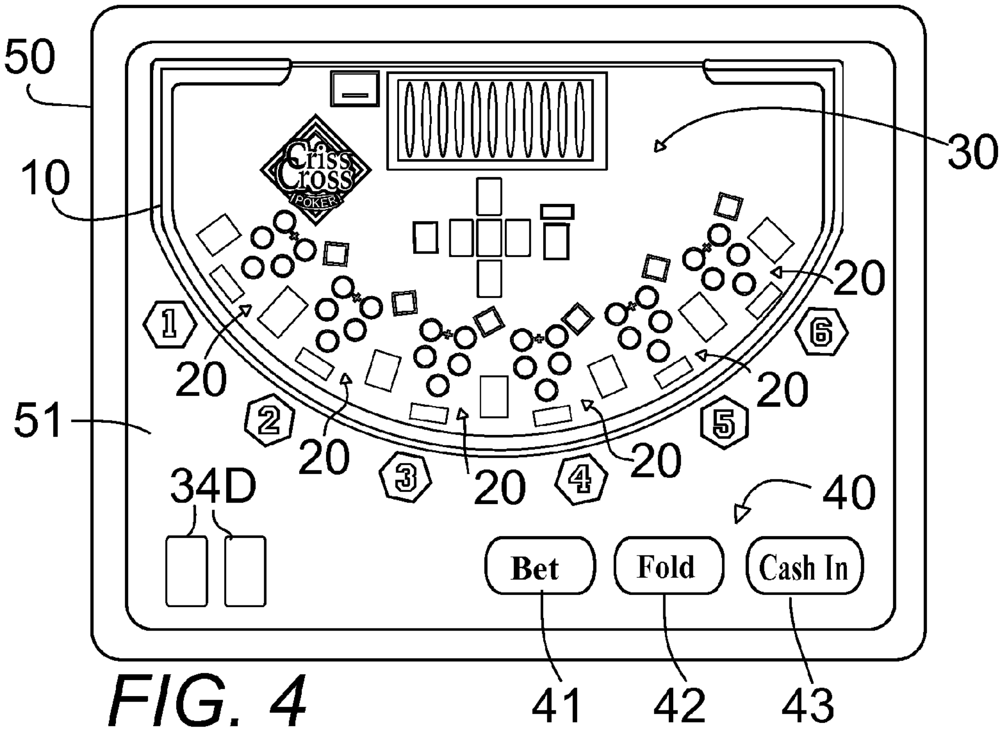
FIG. 4 is an elevational view of a simulation of the casino card game playing table layout of FIG. 1 for the criss cross poker casino card game combined with an additional middle bet and an optional five card bonus bet of the present invention, shown on a screen of an electronic simulation, showing a simulation of the player layouts and payout tables and the dealer layout with the criss cross community cards and payout tables, and a player card layout showing the player's two dealt cards, and the control areas for the player to activate in making choices during the play of the criss cross poker casino card game combined with an additional middle bet and an optional five card bonus bet of the present invention.
Figure 5:
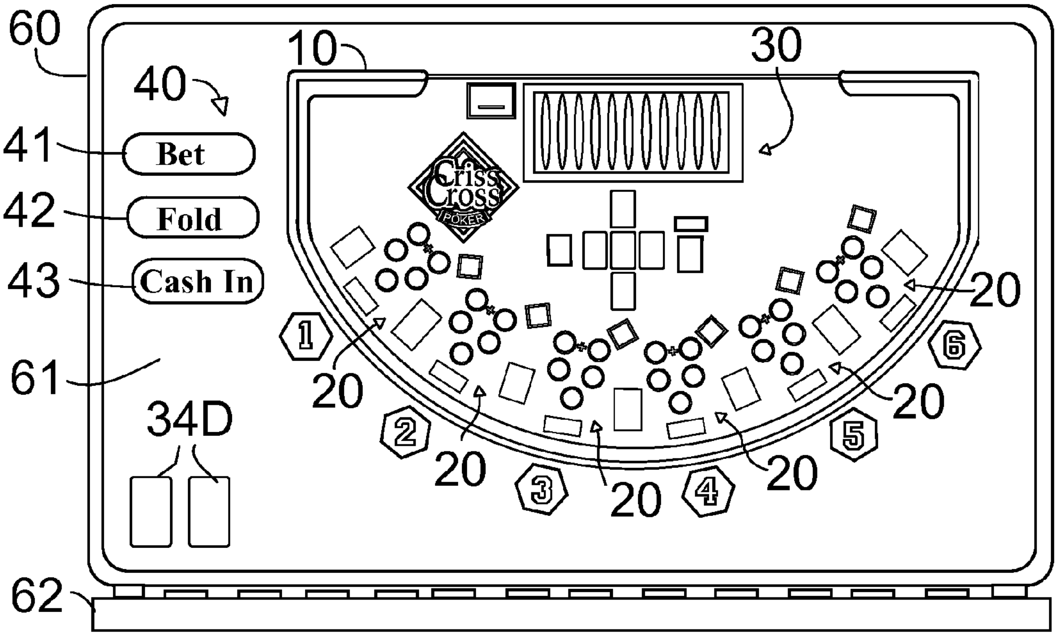
FIG. 5 is an elevational view of a simulation of the playing table layout of FIG. 1 for the criss cross poker casino card game combined with an additional middle bet and an optional five card bonus bet of the present invention, shown on a screen of a computer device showing a simulation of the player layouts with betting areas and payout tables and a simulation of the player's two dealt cards, and the dealer layout and pay table and the criss cross layout of die five community cards, and the control areas for the player to activate in making choices during the play of the criss cross poker casino card game combined with an additional middle bet and an optional five card bonus bet of the present invention.
Figure 6:
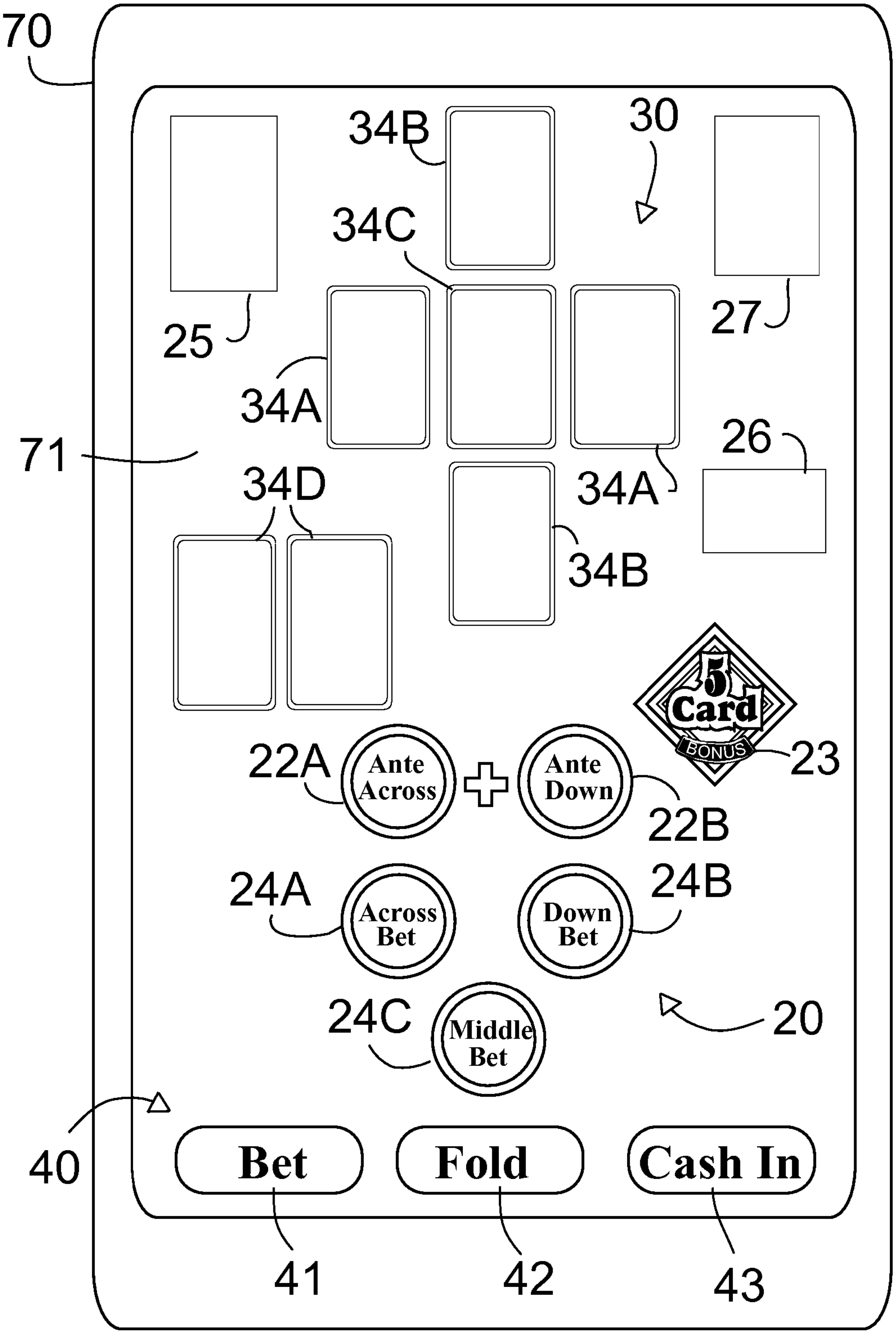
FIG. 6 is an elevational view of a simulation of a player layout for the playing table layout of FIG. 1 for the criss cross poker casino card game combined with an additional middle bet and an optional five card bonus bet of the present invention, shown on a touch screen of a wireless device showing a simulation of a player layout with betting areas and payout tables and a simulation of the player's two dealt cards, and the criss cross layout of the five community cards, and the control areas for the player to activate in making choices during the play of the criss cross poker casino card game combined with an additional middle bet and an optional five card bonus bet of the present invention.

The second step of the method of playing the criss cross poker casino card game combined with an additional middle card bet 24C and an optional five card poker bonus bet 23 may alternately comprise providing the playing layout on any of a variety of simulation devices, such as electronic simulation devices 50, 60, and 70, as shown in FIGS. 4-6, with the criss cross poker layout 10 appearing electronically on a viewing screen 51, 61, and 71 which further comprises providing a plurality of control areas 40 on the electronic viewing screen for the at least one player to activate to control the electronic simulation device in making player choices during the play, for at least one player to play the criss cross poker casino card game combined with an additional middle bet 24C and an optional five card poker bonus bet 23 according to the method of the present invention.

In FIG. 6, the second step of the method of playing the criss cross poker casino card game combined with an additional middle bet 24C and an optional five card poker bonus bet 23 comprises providing a single player portion 20 with betting areas 22A, 221, 23, 24A-24C and player payout tables 25-27 as well as the criss cross community cards 34A-34C in the dealer portion 30 of the playing layout 10 on a handheld electronic simulation device 70, such as a smart phone or tablet, the handheld electronic simulation device comprising a touch screen 71 as the means for displaying the player portion 20 and dealer portion 30 as well as the means for interacting with the handheld electronic simulation device. The touch screen comprising a plurality of designated control areas 40 on the electronic viewing screen 71 for the at least one player to activate by touching appropriate designated control areas of the screen to control the electronic simulation device in making player choices during the play of the criss cross poker casino card game combined with an additional middle card bet 24C and an optional five card poker bonus bet 23 according to the method of the present invention.

In FIGS. 4 and 5, player locations on the multi-player electronic devices 50 and 60 are demarked by player numbers 1-6 within hexagonal outlines at a designated table location around the simulated game layout 10 on the screen 51 and 61. In FIGS. 4-6, in using the method of the present invention on an electronic device 50, 60, or 70 interactions are made by a player using a mouse or keyboard input or a touch screen input to activate each bet area: once for each ante in the across ante 22A and down ante 22B betting areas and then activate each of the other betting areas 23 and 24A-24C once for each ante amount of the bet, once for one time the ante bet, twice for two times the ante bet, and three times for three times the ante bet and then activate the Bet area 41 when the player betting is finished for that turn or alternately activate the Fold area 42 when the player is not betting. When the player is finished playing the game, at the end of a round of play, the player activates the Cash In area 43 to cash in the player's winnings.

The electronic device, such as a computer 60 or a mobile device 70, may have a connection to a remote network to play the criss cross poker casino card game combined with an additional middle card bet 24C and an optional five card poker bonus bet 23 according to the method of the present invention. The electronic device having a connection to a remote network to play the criss cross poker casino card game combined with an additional middle card bet 24C and an optional five card poker bonus bet 23 according to the method of the present invention on an electronic device taken from the list of electronic devices including a computer, a handheld device, a telephonic device, an entertainment device, a gaming device, and a television device.

In use, the method of the present invention is played out as follows:

A player selects a table position at the real or simulated criss cross poker casino card game layout 10.

An across ante 22A and a down ante 22B are input by each player in order to start the game. An optional five card bonus bet 23 according to betting limits set by the casino for minimum and maximum five card bonus bet amounts.

Five community cards, a community middle card 33, two outside horizontal community across cards 34A, and two outside vertical community down cards 34B are dealt face down in a criss cross poker configuration in the dealer area 30 for all players to use either the across cards 33 and 34A or the down cards 33 and 34B in combination with two player cards 34D dealt face down to each player to form an across poker hand and a down poker hand.

After the cards are dealt, a player may place an "Across Bet" 24A of one to three times the ante that the players two dealt cards 34D in combination with the three "Across Cards" 33 and 34A form a winning five-card poker hand against a criss cross poker payout table 25, as shown in FIG. 3. Alternately, the player may fold and forfeit the two antes 22A and 22B. The two outside horizontal or across cards 34A are then turned over by the dealer or turned automatically by an electronic simulation device after all bets are placed.

A player may then place a "Down Bet" 248 that the player's two dealt cards 34D) in combination with the three "Down Cards" 33 and 34B form a winning five-card poker hand against the criss cross poker payout table 25. Alternately the player may fold and forfeit the antes and the across bet. The two outside vertical or down cards 34B are then turned over by the dealer or automatically in the electronic simulations after all bets are placed.

At this time the player may place a "Middle Bet" 24C that the player's two dealt cards 34D in combination with either the three community across cards 33 and 34A or the three community down cards 33 and 34B forms a winning hand, with the higher hand being paid out according to the criss cross poker payout table 25. Alternately the player may fold and forfeit the antes, the across bet, and the down bet. The dealer or electronic simulation device then turns over the middle community card 33 after all bets are placed.

After the middle card 33 is turned up, all winning bets are paid: the across bet 24A, the down bet 24B, and the middle bet 24C are paid according to a criss cross poker payout table 25. The across ante 22A and the down ante 221 are paid according to the ante payout table 26. If the five community cards 33, 34A and 34B of the criss cross community card configuration together as a five card poker hand is a winning hand, the five card bonus bets 23 are paid according to a five card bonus payout table 27.

The additional middle bet 24C and the optional five card bonus bet 23 are played with the same cards as the criss cross poker casino card game and do not affect the play of the criss cross poker casino card game. They provide additional betting opportunities in the criss cross poker casino card game.

It is understood that the preceding description is given merely by way of illustration and not in limitation of the invention and that various modifications may be made thereto without departing from the spirit of the invention as claimed.

What is claimed is:

1. A method of playing a criss-cross poker card game, the method comprising the following steps in the sequence set forth:

providing at least one deck of physical playing cards;

receiving at least one ante wager;

dealing community cards from the deck of physical playing cards in a cross formation facing down, the cross formation having a middle card and at least two horizontal outside cards forming a horizontal across partial hand, and having at least two vertical outside cards disposed above and below the middle card forming a vertical down partial hand;

dealing at least two cards to the player, the at least two cards and the horizontal across partial hand forming a horizontal poker hand, and the at least two cards and the vertical down partial hand forming a vertical poker hand;

receiving an across wager from the player on the horizontal poker hand prior to revealing the at least two horizontal outside cards, wherein if the across wager is not received from the player, then the player forfeits the ante wager turning over and revealing the at least two horizontal outside cards to be facing up;

receiving a vertical wager from the player on the vertical poker hand prior to revealing the at least two vertical outside cards, wherein if the vertical wager is not received from the player, then the player forfeits the ante wager;

turning over and revealing the at least two vertical outside cards to be facing up and turning over and revealing the middle card to be facing up; and paying out winnings to the player based on the wagers received if at least one of the horizontal poker hand and the vertical poker hand comprises a winning hand by comparing the horizontal poker hand and the vertical poker hand to at least one predetermined pay table.

2. The method according to claim 1, comprising paying out winnings to the player if the horizontal poker hand comprises a winning hand if said player placed a required across wager and paying out winnings to the player if the vertical poker hand comprises a winning hand if said player placed a required vertical wager.

3. The method according to claim 1, wherein when the across wager and the vertical wager are received by the player and prior to revealing the middle card, the method further comprises receiving a middle wager from the player on the higher of either the vertical poker hand and the horizontal poker hand, and if the middle wager is not received from the player, then the player forfeits the ante wager, the across wager, and the vertical wager.

4. The method according to claim 3, wherein the step of receiving a middle wager comprises receiving a wager of one to three times the ante wager.

5. The method according to claim 3, wherein paying out winnings comprises paying out the horizontal, vertical, and middle wagers according to said at least one predetermined paytable: 500 to 1 for a royal flush, 100 to 1 for a straight flush, 40 to 1 for four of a kind, 21 to 1 for a full house, 8 to 1 for a flush, 5 to 1 for a straight, 3 to 1 for three of a kind, 2 to 1 for two pair, 1 to 1 for a pair of jacks or better, and push for a pair of sixes to a pair of tens.

6. The method according to claim 1, wherein the step of receiving an across wager from the player comprises receiving a wager of one to three times the ante wager.

7. The method according to claim 1, wherein the step of receiving a vertical wager from the player comprises receiving a wager of one to three times the ante wager.

8. The method according to claim 1, further comprising receiving at least one ante wager from said player and wherein said step of paying out winnings for a winning horizontal poker hand or a winning vertical poker hand comprises paying out the ante wager according to an ante payout table paying out: 1 to 1 for a pair of jacks or better, and push for a pair of sixes to a pair of tens.

9. The method according to claim 1, further comprising receiving an optional bonus wager from said player and paying out bonus winnings if said community cards comprise a winning hand, wherein said bonus winnings are paid according to a bonus payout table paying out: 250 to 1 for a royal flush, 100 to 1 for a straight flush, 40 to 1 for four of a kind, 15 to 1 for a full house, 10 to 1 for a flush, 6 to 1 for a straight, 4 to 1 for three of a kind, 3 to 1 for two pair, and 1 to 1 for a pair of sixes or better.

10. The method according to claim 1, wherein the ante wager is received at a designated ante wager location defined at a gaming table for presenting the criss-cross poker game, the community cards are dealt onto a community card area designated on the gaming table, the across wager is received at a designated across wager location defined at the gaming table, and the vertical wager is received at a designated down wager location defined at the gaming table.

11. An electronic gaming machine comprising:

at least one display, a player input device, and a processor including at least one random number generator, the processor being configured to execute machine readable code that causes the electronic gaming machine to, in the following order:

(1) receive at least one ante wager;

(2) display on the at least one display community cards from at least one virtual deck of playing cards in a cross formation facing down, the community cards being randomly selected via the random number generator, the cross formation having a middle card and at least two horizontal outside cards forming a horizontal across partial hand, and having at least two vertical outside cards disposed above and below the middle card forming a vertical down partial hand;

(3) display at least two player cards on the at least one display facing up, the at least two player cards being randomly selected via the random number generator, the at least two player cards and the horizontal across partial hand forming a horizontal poker hand, and the at least two player cards and the vertical down partial hand forming a vertical poker hand;

(4) receive via the player input device an across wager from the player on the horizontal poker hand prior to revealing the at least two horizontal outside cards, wherein if the across wager is not received from the player, then the player forfeits the ante wager, (5) reveal the horizontal outside cards by displaying the cards facing up on the at least one display;

(6) receive via the player input device a vertical wager from the player on the vertical poker hand prior to revealing the at least two vertical outside cards, wherein if the vertical wager is not received from the player, then the player forfeits the ante wager;

(7) reveal the vertical outside cards by displaying the cards facing up on the at least one display and revealing the middle card by displaying the middle card facing up on the at least one display; and (8)pay out winnings to the player based on wagers received if at least one of the horizontal poker hand and the vertical poker hand comprises a winning hand by comparing the horizontal poker hand and the vertical poker hand to at least one predetermined pay table.

12. The machine according to claim 11, wherein when the across wager and the vertical wager are received by the player and prior to revealing the middle card, the electronic gaming machine is further configured to receive a middle wager from the player on the higher of either the vertical poker hand and the horizontal poker hand, and if the middle wager is not received from the player, then the player forfeits the ante wager, the across wager, and the vertical wager.

13. The machine according to claim 12, wherein receiving a middle wager comprises receiving a wager of one to three times the ante wager.

14. The machine according to claim 12, wherein paying out winnings comprises paying out the horizontal, vertical, and middle wagers according to said at least one predetermined paytable: 500 to 1 for a royal flush, 100 to 1 for a straight flush, 40 to 1 for four of a kind, 21 to 1 for a full house, 8 to 1 for a flush, 5 to 1 for a straight, 3 to 1 for three of a kind, 2 to 1 for two pair, 1 to 1 for a pair of jacks or better, and push for a pair of sixes to a pair of tens.

15. The machine according to claim 11, wherein receiving an across wager from the player comprises receiving a wager of one to three times the ante wager.

16. The machine according to claim 11, wherein receiving a vertical wager from the player comprises receiving a wager of one to three times the ante wager.

17. The machine according to claim 11, further comprising receiving at least one ante wager from said player and wherein said step of paying out winnings for a winning horizontal poker hand or a winning vertical poker hand comprises paying out the ante wager according to an ante payout table paying out: 1 to 1 for a pair of jacks or better, and push for a pair of sixes to a pair of tens.

18. The machine according to claim 11, further comprising receiving an optional bonus wager from said player and paying out bonus winnings if said community cards comprise a winning hand, wherein said bonus winnings are paid according to a bonus payout table paying out: 250 to 1 for a royal flush, 100 to 1 or a straight flush, 40 to 1 for four of a kind, 15 to 1 for a full house, 10 to 1 for a flush, 6 to 1 for a straight, 4 to 1 for three of a kind, 3 to 1 for two pair, and 1 to 1 for a pair of sixes or better.

19. A method of playing a criss-cross poker card game, the method comprising the following steps in the sequence set forth:

providing at least one deck of physical playing cards;

receiving at least one ante wager;

dealing community cards from the deck of physical playing cards in a cross formation facing down, the cross formation having a middle card and at least two horizontal outside cards forming a horizontal across partial hand, and having at least two vertical outside cards disposed above and below the middle card forming a vertical down partial hand;

dealing at least two cards to the player, the at least two cards and the horizontal across partial hand forming a horizontal poker hand, and the at least two cards and the vertical down partial hand forming a vertical poker hand;

receiving a vertical wager from the player on the vertical poker hand prior to revealing the at least two vertical outside cards, wherein if the vertical wager is not received from the player, then the player forfeits the ante wager;

turning over and revealing the at least two vertical outside cards to be facing up and turning over and revealing the middle card to be facing up;

receiving an across wager from the player on the horizontal poker hand prior to revealing the at least two horizontal outside cards, wherein if the across wager is not received from the player, then the player forfeits the ante wager turning over and revealing the at least two horizontal outside cards to be facing up; and paying out winnings to the player based on the wagers received if at least one of the horizontal poker hand and the vertical poker hand comprises a winning hand by comparing the horizontal poker hand and the vertical poker hand to at least one predetermined pay table.

20. The method according to claim 19, wherein the ante wager is received at a designated ante wager location defined at a gaming table for presenting the criss-cross poker game, the community cards are dealt onto a community card area designated on the gaming table, the across wager is received at a designated across wager location defined at the gaming table, and the vertical wager is received at a designated down wager location defined at the gaming table.

* * * * *